United States Patent
Bae et al.

(10) Patent No.: US 9,571,322 B2
(45) Date of Patent: Feb. 14, 2017

(54) TRANSMITTER, RECEIVER AND CONTROLLING METHOD THEREOF

(71) Applicant: SAMSUNG ELECTRONICS CO., LTD., Suwon-si (KR)

(72) Inventors: Jae-hyeon Bae, Seoul (KR); Young-ho Oh, Suwon-si (KR); Jae-sung Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/588,740

(22) Filed: Jan. 2, 2015

(65) Prior Publication Data
US 2015/0195116 A1    Jul. 9, 2015

(30) Foreign Application Priority Data
Jan. 3, 2014 (KR) .................. 10-2014-0000808

(51) Int. Cl.
*H04L 27/10*  (2006.01)
*H04L 27/26*  (2006.01)

(52) U.S. Cl.
CPC ....... *H04L 27/2627* (2013.01); *H04L 27/2634* (2013.01); *H04L 27/2649* (2013.01)

(58) Field of Classification Search
CPC ....... H04B 3/32; H04B 3/23; H04L 25/03343; H04L 25/497; H04L 25/03057
USPC .................. 375/259–285, 295–352
See application file for complete search history.

(56) References Cited

U.S. PATENT DOCUMENTS

| | | | |
|---|---|---|---|
| 7,787,520 B2* | 8/2010 | Kent et al. ............... | 375/148 |
| 8,059,738 B2 | 11/2011 | Kwon et al. | |
| 8,340,203 B2 | 12/2012 | Kwon et al. | |
| 8,873,658 B2 | 10/2014 | Kwon et al. | |
| 9,318,794 B2* | 4/2016 | Chang ............... | H01Q 1/243 |
| 2008/0101491 A1* | 5/2008 | Lee ................ | H04L 27/0008 |
| | | | 375/260 |
| 2008/0192622 A1* | 8/2008 | Scheim et al. .......... | 370/210 |
| 2008/0212698 A1 | 9/2008 | Kim et al. | |
| 2009/0220019 A1 | 9/2009 | Kwon et al. | |

(Continued)

FOREIGN PATENT DOCUMENTS

KR    10-0767700 B1    10/2007
KR    10-1100208 B1    12/2011

OTHER PUBLICATIONS

Communication dated Feb. 24, 2015 issued by the Int. Searching Authority in counterpart Application No. PCT/KR2014/012091 (PCT/ISA/210).

(Continued)

*Primary Examiner* — James M Perez
(74) *Attorney, Agent, or Firm* — Sughrue Mion, PLLC

(57) ABSTRACT

Provided are a transmitter, receiver and method of transmitting and receiving Orthogonal Frequency-Division Multiplexing (OFDM) symbols. The transmitter includes: a sub carrier grouping part configured to perform grouping of a plurality of sub carriers into a plurality of groups, and to change phases and/or amplitudes of the plurality of sub carriers by group; and a transmitting part configured to generate at least one OFDM symbol from the plurality of sub carriers of which the phases and/or the amplitudes have been randomly changed by group, and to transmit the OFDM symbol and information about the grouping.

18 Claims, 10 Drawing Sheets

(56) References Cited

U.S. PATENT DOCUMENTS

| | | | |
|---|---|---|---|
| 2010/0091896 A1* | 4/2010 | Lee | H04B 7/12 |
| | | | 375/260 |
| 2012/0093248 A1 | 4/2012 | Kwon et al. | |
| 2013/0040682 A1* | 2/2013 | Chang | H01Q 1/243 |
| | | | 455/517 |
| 2013/0148608 A1 | 6/2013 | Wang et al. | |
| 2013/0177093 A1 | 7/2013 | Kwon et al. | |
| 2014/0205032 A1* | 7/2014 | Murakami et al. | 375/267 |
| 2014/0219389 A1* | 8/2014 | Murakami et al. | 375/296 |
| 2014/0286248 A1* | 9/2014 | Lee | H04L 27/2614 |
| | | | 370/329 |
| 2015/0036764 A1* | 2/2015 | Oh | H04L 27/2613 |
| | | | 375/295 |
| 2015/0036765 A1* | 2/2015 | Yun | H04L 5/0048 |
| | | | 375/296 |
| 2015/0350388 A1* | 12/2015 | Bae | H04L 27/2607 |
| | | | 370/474 |

OTHER PUBLICATIONS

Communication dated Feb. 24, 2015 issued by the Int. Searching Authority in counterpart Application No. PCT/KR2014/012091 (PCT/ISA/237).

* cited by examiner

FIG. 4

| Index | Number |
|-------|--------|
| 0 | 4 |
| 1 | 8 |
| 2 | 16 |
| 3 | 32 |

<Subcarrier Index Table>

Delay =16 Sample, 0dB echo channel (PHASE 0')

Delay = 16 Sample, 0dB echo (PHASE 180')

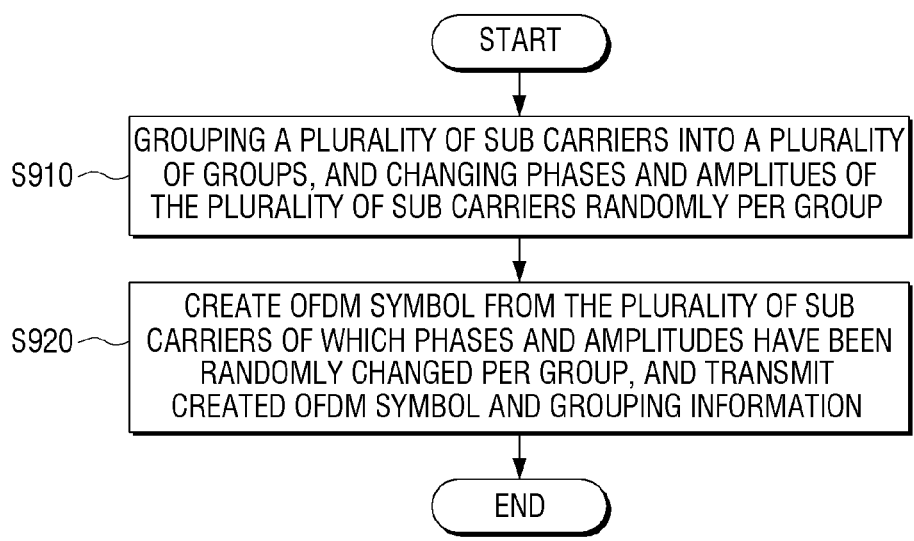

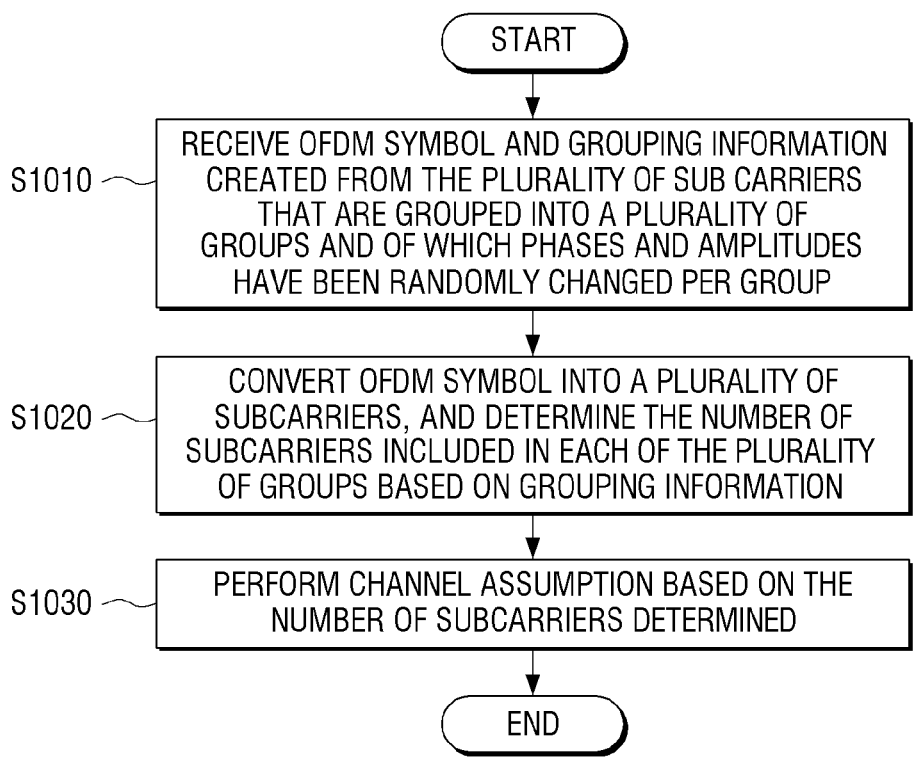

TRANSMITTER, RECEIVER AND CONTROLLING METHOD THEREOF

CROSS-REFERENCE TO RELATED APPLICATIONS

This application claims priority from Korean Patent Application No. 10-2014-0000808, filed in the Korean Intellectual Property Office on Jan. 3, 2014, the disclosure of which is incorporated herein by reference.

BACKGROUND

1. Field

Methods and apparatuses consistent with the exemplary embodiments relate to a transmitter, receiver and controlling method of transmitting and receiving Orthogonal Frequency-Division Multiplexing (OFDM) symbols.

2. Description of the Prior Art

DVB-T2 (Digital Video Broadcasting the Second Generation Terrestrial) is a second generation European terrestrial digital broadcast standard the performance of which has been improved from DVB-T which is adopted in more than 35 countries in the world including Europe. For DVB-T2, the transmission capacity and bandwidth have been improved by applying the latest technologies such as Low Density Parity Check (LDPC) codes and 256-QAM modulation method. Accordingly, it has an advantage of providing various high quality services such as high-definition television (HDTV) service in a limited bandwidth.

Meanwhile, DVB-NGH (Next Generation Handheld) has its basis on the concept of DVB-T2, and it is an extension of DVB-T2. DVB-NGH defines the next generation transmission system for broadcast digital terrestrial and hybrid (combination of satellite transmission and terrestrial wave) in portable terminals.

The DVB-T2 or DVB-NGH method uses an OFDM system which utilizes the Cyclic Delay Diversity (CDD) method in order to obtain the diversity effect. Herein, in the CDD method, at the frequency axis, the phase increases at a regular rate in each sub carrier, and thus there exists an echo with strong and long delay time, causing deterioration of performance of receivers in environments of increased selectivity.

SUMMARY

One or more exemplary embodiments provide a transmitter configured to process sub carriers in the frequency domain, a receiver, and a controller method thereof.

According to an aspect of an exemplary embodiment, there is provided a transmitter which may include: a sub carrier grouping part configured to perform grouping of a plurality of sub carriers into a plurality of groups, and to change phases and/or amplitudes of the plurality of sub carriers by group; and a transmitting part configured to generate at least one OFDM symbol from the plurality of sub carriers of which the phases and/or the amplitudes have been randomly changed by group, and to transmit the OFDM symbol and information about the grouping.

Herein, the sub carrier grouping part may perform the grouping of the plurality of sub carriers such that at least two groups of the plurality of groups have different numbers of subcarriers.

In addition, the grouping information may include information on a number of sub carriers grouped into each of the plurality of groups.

In addition, the sub carrier grouping part may change the phases of the plurality of the sub carriers in order to differentiate the plurality of groups and randomly change the amplitudes of the sub carriers of which the phases have been changed, by group.

Meanwhile, the grouping information may include a table showing the number of the sub carriers included in each of the plurality of groups.

According to an aspect of another exemplary embodiment, there is provided a receiver which may include: a receiving part configured to receive at least one Orthogonal Frequency-Division Multiplexing (OFDM) symbol is generated from a plurality of sub carriers which are grouped into a plurality of groups and of which phases and/or amplitudes have been changed by group, and grouping information about the grouping; a signal processor configured to convert the OFDM symbol into the plurality of sub carriers, and to determine a number of sub carriers included in each of the plurality of groups based on the grouping information; and a channel assumer configured to perform a channel assumption based on the number of the sub carriers included in each of the plurality of groups.

Herein, each of the plurality of groups may include a different number of sub carriers.

In addition, the grouping information may include information on the number of the sub carriers included in each of the plurality of groups.

In addition, the grouping information may include a table showing the number of the sub carriers included in each of the plurality of groups.

According to an aspect of still another exemplary embodiment, there is provided a method of controlling a transmitter which may include: grouping a plurality of sub carriers into a plurality of groups, and changing phases and/or amplitudes of the plurality of sub carriers by group; and generating at least one OFDM symbol, which is generated from the plurality of sub carriers of which phases and amplitudes have been randomly changed, per group, and transmitting the generated OFDM symbol and grouping information.

Herein, the grouping may be performed such that at least two groups of the plurality of groups have different numbers of subcarriers.

In addition, the grouping information may include information on a number of sub carriers grouped into each of the plurality of groups.

In addition, the changing may be performed by changing the phases of the plurality of the sub carriers in order to differentiate the plurality of groups and randomly changing the amplitudes of the sub carriers of which the phases have been changed, by group.

In addition, the grouping information may include a table showing the number of the sub carriers included in each of the plurality of groups.

According to an aspect of still another exemplary embodiment, there is provided a method of controlling a receiver which may include: receiving at least one OFDM symbol generated from a plurality of sub carriers which are grouped into a plurality of groups and of which phases and/or amplitudes have been changed by group, and grouping information about the grouping; converting the OFDM symbol into the plurality of sub carriers, and determining a number of sub carriers included in each of the plurality of groups based on the grouping information; and performing a channel assumption based on the number of the sub carriers included in each of the plurality of groups.

Herein, each of the plurality of groups may include a different number of sub carriers.

In addition, the grouping information may include information on the number of the sub carriers included in each of the plurality of groups.

In addition, the grouping information may include a table showing the number of the sub carriers included in each of the plurality of groups.

As aforementioned according to various exemplary embodiments, restoration can be made based on the received signals, and accordingly, channel assumption can be made even when the channel environment is poor.

BRIEF DESCRIPTION OF THE DRAWINGS

The above and/or other aspects of the exemplary embodiments will be more apparent by describing certain present disclosure with reference to the accompanying drawings, in which:

FIG. 4 is a view illustrating a sub carrier index table according to an exemplary embodiment;

FIG. 9 is a flowchart for explaining a controlling method of a transmitter according to an exemplary embodiment; and FIG. 10 is a flowchart for explaining a controlling method of a receiver according to an exemplary embodiment

DETAILED DESCRIPTION OF THE EXEMPLARY EMBODIMENTS

Figure 1:
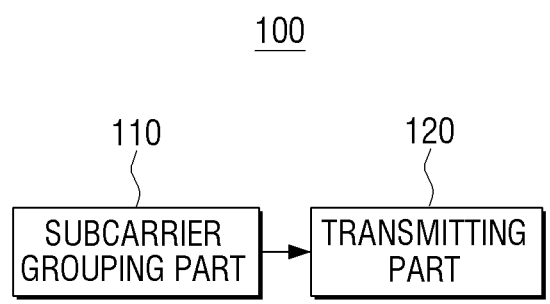
FIG. 1 is a block diagram illustrating a configuration of a transmitter according to an exemplary embodiment.

Certain exemplary embodiments of the inventive concept are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, the inventive concept can be practiced without those specifically defined matters. Also, well-known functions or constructions are not described in detail since they would obscure the application with unnecessary detail.

FIG. 1 is a block diagram illustrating a configuration of a transmitter according to an exemplary embodiment of the inventive concept.

According to FIG. 1, the transmitter 100 may comprise a sub carrier grouping part 110 and a transmitting part 120.

Herein, the sub carrier grouping part 110 and the transmitting part 120 according to the exemplary embodiment may be applied to the OFDM symbol generation process of transmitters disclosed in the DVB-NGH standard documents.

The sub carrier grouping part 110 may be applied before the inverse Fast Fourier Transform (IFFT) operation in the OFDM symbol generation process of DVB-NGH. Furthermore, the transmitting part 120 may be applied to the IFFT operation, peak to average power ratio (PAPR) reduction operation, Guard interval insertion operation, P1 and P2 symbol insertion operation and digital to analog (D/A) conversion operation.

Meanwhile, the contents of the DVB-NGH standard documents are well known, and thus detailed explanation thereof is omitted herein.

The sub carrier grouping part 110 may perform grouping of a plurality of sub carriers into a plurality of groups, and change phases and amplitudes of the plurality of sub carriers randomly per group.

In the frequency domain, the sub carrier grouping part 110 may perform grouping of the plurality of sub carriers into a plurality of groups each group having random sub carriers, randomly change the amplitudes by group.

Figure 2:
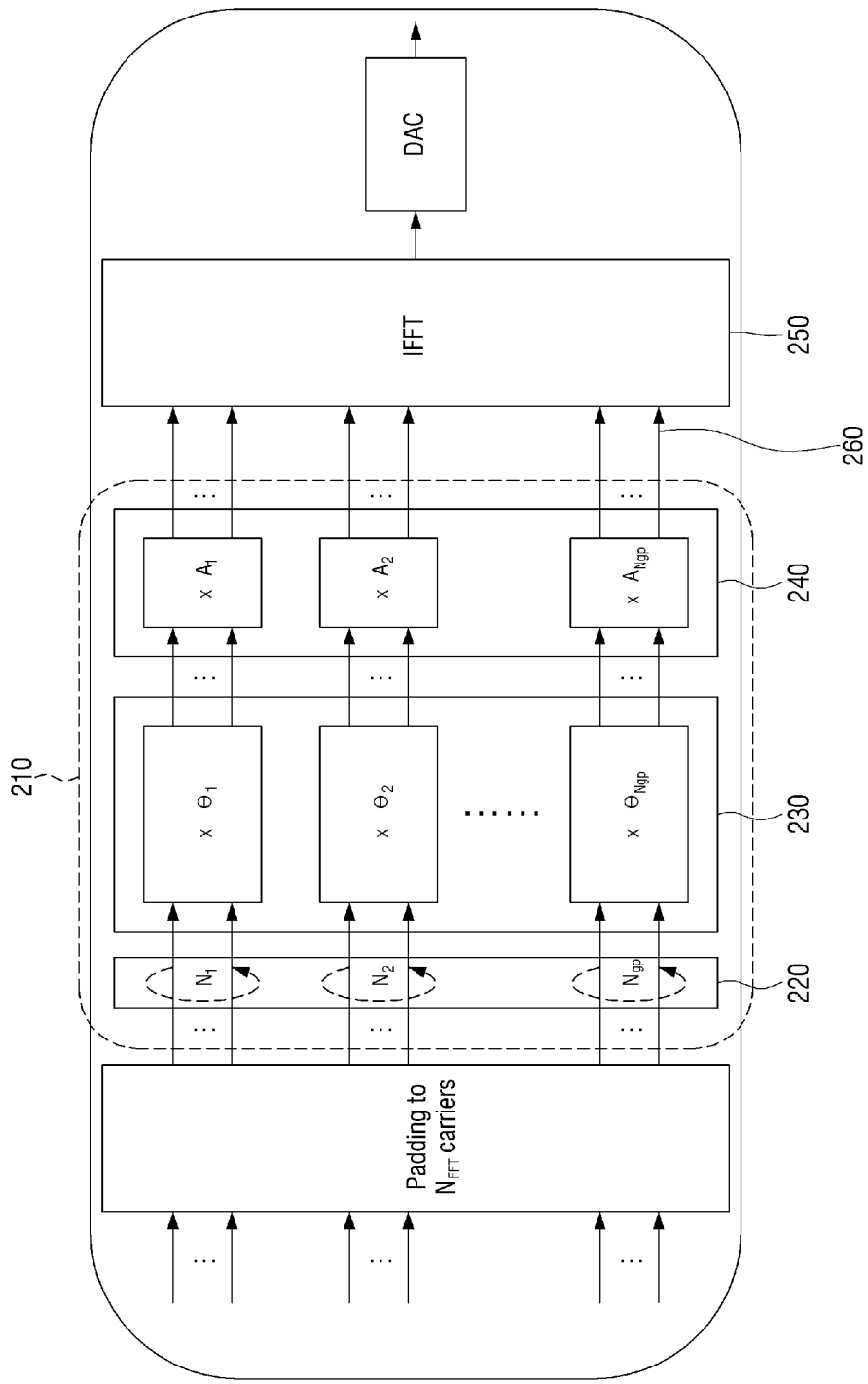
FIG. 2 is a view illustrating a detailed configuration of a sub carrier grouping part according to an exemplary embodiment.

FIG. 2 is a view of a detailed configuration of a sub carrier grouping part according to an exemplary embodiment.

According to FIG. 2, in the frequency domain, the sub carrier grouping part 210 may perform grouping 220 of a plurality of sub carriers into a plurality of groups, perform an operation 230 of applying, e.g., multiplying, random phase values to the groups regarding the grouped plurality of sub carriers 230, and perform an operation 240 of applying random amplitude values to the groups.

The sub carrier grouping part 210 may change the phases of a plurality of sub carriers randomly by group in order to differentiate the plurality of groups, and randomly change the amplitudes of the plurality of sub carriers of which the phases have been changed.

That is, the sub carrier grouping part 210 changes the phases of the sub carriers included in each of the plurality of groups for the purpose of differentiating the plurality of groups, so that there is a difference in phase value even when the intensity of the signals are the same, thereby enabling differentiation between the plurality of groups.

In addition, it is possible to randomly change the amplitudes of the plurality of sub carriers of which the phases have been changed by group, to enable restoration of the sub carriers even when a null value occurs such as in 0 db echo channel.

Meanwhile, a signal 260 output from the sub carrier grouping part 210 may be converted from a signal of frequency domain into a signal of time domain by IFFT 250, and such a signal of time domain is upconverted by the DAC and is transmitted as a radio frequency (RF) signal.

In the related art, when using the CCD method for a signal of time domain, if the channel condition is not good, the delay section is shortened in the time domain to repeatedly send the same signal thereby obtaining the time diversity effect.

However, according to the existing CCD method, if the delay section is long in the time domain, the long echo would increase selectivity, leading to deterioration of receiving performance.

Thus, unlike the existing CCD of related art, the sub carrier grouping part 210 of the present embodiment performs grouping of the sub carriers in the frequency domain, thereby reducing the deterioration of performance due to such selectivity. More detailed explanation is made hereinbelow.

A delay that occurs in the time domain may be described by change of frequency in the frequency domain as in equation 1 below.

$$s((I - \delta_{ccd}) \bmod N) = \frac{1}{\sqrt{N}} \sum_{i=0}^{N} e^{-j\frac{2\pi}{N} \cdot \delta_{ccd} \cdot i} \cdot S(i) \cdot e^{-j\frac{2\pi}{N} \cdot i \cdot j} \quad (1)$$

That is, in the case of delaying as much as $\delta_{ccd}$ in the time domain regarding the same signal in the CDD method and then transmitting the signal, the delayed amplitude $\delta_{ccd}$ in the time domain may be described as change of frequency in the frequency domain, which means that a certain phase change in the frequency domain may indicate the effect of time delay that occurs in the time domain.

Accordingly, the sub carrier grouping part 210 according to the present embodiment may process the sub carriers in the frequency domain before a signal of frequency domain is converted into a signal of time domain through IFFT 250. Accordingly, when this conversion is made into a signal of time domain through IFFT 250, the sub carrier grouping part 210 may enable the effect of time delay to occur in the time domain as well.

Herein, the sub carrier grouping part 110 may perform grouping of the plurality of sub carriers in random numbers by group.

When transmission is to be made to a mobile terminal apparatus, since the channel conditions supporting mobile terminal apparatuses are poor, the sub carrier grouping part 110 may perform grouping of the plurality of sub carriers into a large number of groups.

Furthermore, when transmission is to be made to a fixed terminal apparatus, since the channel conditions supporting fixed terminal apparatuses are good, the sub carrier grouping part 110 may perform grouping the plurality of sub carriers into a small number of groups.

Therefore, the sub carrier grouping part 110 may perform grouping of the plurality of sub carriers into groups according to the channel conditions, or perform grouping of the plurality of sub carriers in random numbers by group in order to respond to the changing channel conditions or to support both mobile terminal apparatuses and fixed terminal apparatuses.

Meanwhile, in the above exemplary embodiment, it was explained that the sub carrier grouping part 110 performs grouping of the plurality of sub carriers in random numbers by group, but the plurality of sub carriers may of course be grouped in predetermined numbers as well.

Figure 3:
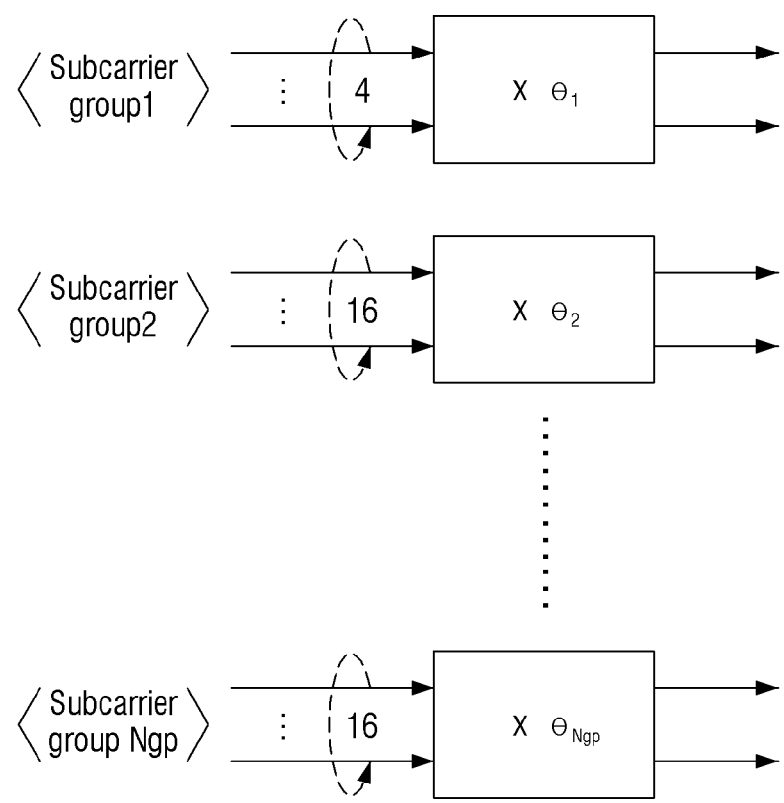
FIG. 3 is a view for explaining a process of grouping a plurality of sub carriers according to an exemplary embodiment.

FIG. 3 is a view for explaining a process of performing grouping of a plurality of sub carriers according to an exemplary embodiment.

With reference to FIG. 3, a sub carrier group 1 comprises four (4) sub carriers, a sub carrier group 2 comprises 16 sub carriers, and a sub carrier group Ngp comprises 16 sub carriers.

For example, in the case where the sub carrier grouping part 110 performs multiple input single output (MISO) processing in order to transmit contents that support both mobile terminal apparatuses and fixed terminal apparatuses, the sub carrier group 1 that is grouped in a relatively small group of four (4) sub carriers may be used in transmission to a mobile terminal apparatus where there is much noise and thus has a poor channel environment.

In addition, the sub carrier group 2 that is grouped in a relatively large group of 16 sub carriers may be used in transmission to a fixed terminal apparatus where there is relatively less noise and thus has a good channel environment.

That is, in a case where there is much noise and the channel environment is poor, and thus there is much long echo, signals have to be cut in small pieces and then received for the receiver (not illustrated) to assume the channel and restore the signal. Therefore, groups with relatively small number of sub carriers have to be created more in order to transmit and receive signals in poor channel environments.

Furthermore, in a case where there is relatively less noise and thus the channel environment is relatively good, it is possible to assume a channel and restore signals even when the signals are cut in large pieces and received. Therefore, it is also possible to perform good transmission of signals even by generating more groups having a large number of sub carriers.

Accordingly, the sub carrier grouping part 110 may perform grouping of a plurality of sub carriers in random numbers by group in order to support various channel situations.

Meanwhile, with reference to FIG. 1, the transmitting part 120 may generate at least one OFDM symbol from a plurality of sub carriers of which the phases and amplitudes have been randomly changed, and transmit the generated OFDM symbol and grouping information.

Herein, the transmitting part 120 generating an OFDM symbol from a plurality of sub carriers is the same as the function performed by the IFFT, and thus detailed explanation is omitted.

Meanwhile, the transmitting part 120 may transmit the generated OFDM symbol and grouping information, wherein the grouping information may comprise information on the number of sub carriers randomly grouped into a plurality of groups.

For example, with reference to FIG. 3, the sub carrier 1 is grouped as four (4) sub carriers, the sub carrier group 2 is grouped as 16 sub carriers, and the sub carrier group Ngp is grouped as 16 sub carriers.

Therefore, as aforementioned, grouping information is information on the number of sub carriers that are included in each group.

Meanwhile, grouping information may comprise a table of the number of sub carriers included in each of the plurality of groups.

That is, the transmitting part 120 may transmit grouping information in a table format to the receiver to enable the receiver to determine the number of sub carriers included in each of the plurality of groups.

FIG. 4 is a view of a sub carrier index table according to an exemplary embodiment.

According to FIG. 4, when the number of sub carriers included in one group is four (4), the transmitting part 120 may transmit index 0, and when the number of sub carriers included in one group is eight (8), the transmitting part 120 may transmit index 1. In addition, when the number of sub carriers included in one group is 16, the transmitting part may transmit index 2, and when the number of sub carriers included in one groups is 32, the transmitting part may transmit index 3.

In addition, the receiver (not illustrated) already stores the sub carrier index table illustrated in FIG. 4, and may thus determine the number of sub carriers included in each group based on the received index.

Meanwhile, the transmitting part 120 may transmit the sub carrier index table to the receiver (not illustrated) using TXID, etc.

Figure 5:
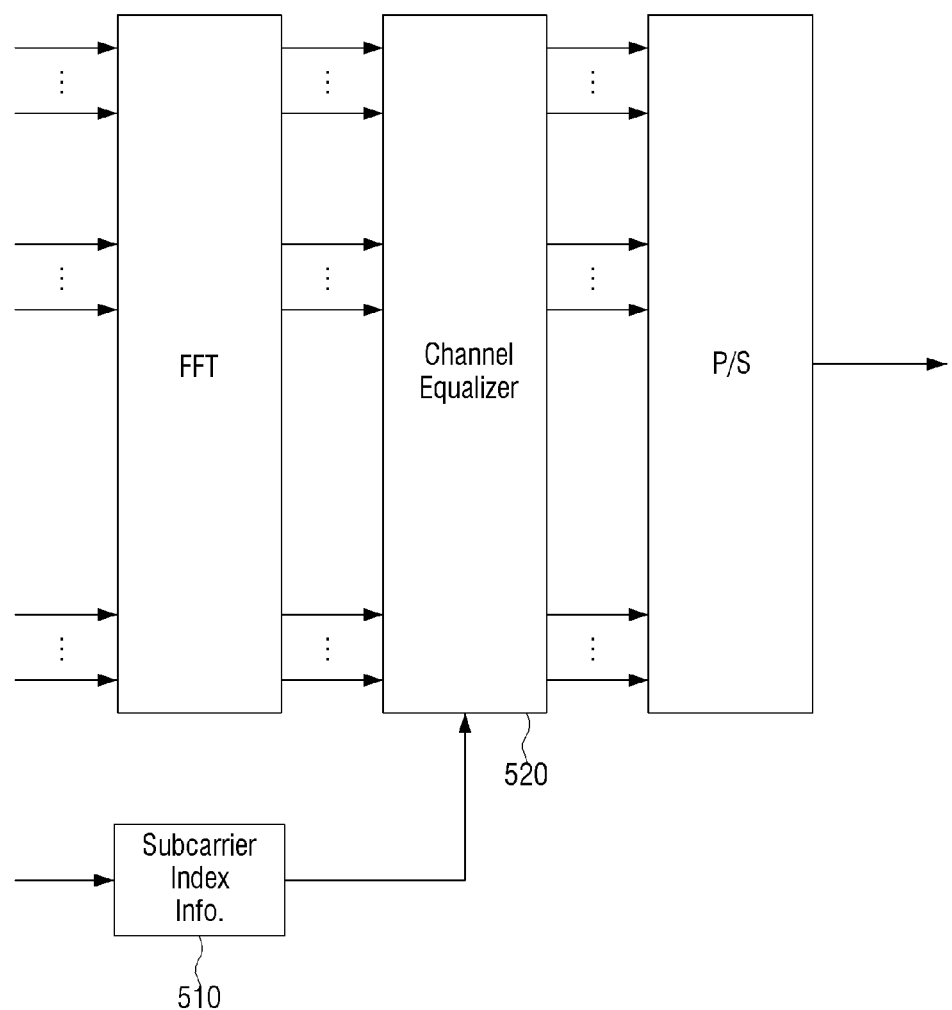
FIG. 5 is a view illustrating a method of transmitting a sub carrier index table according to an exemplary embodiment.

FIG. 5 is a view of a method for transmitting a sub carrier index table according to an exemplary embodiment.

According to FIG. 5, the transmitting part 120 transmits the sub carrier index 510 to the channel assumer 520 of the receiver using the TXID, so as to assist assuming an exact phase when assuming a channel.

The method of the transmitting part 120 transmitting the sub carrier index 510 to the channel assumer 520 was mentioned above, and thus detailed explanation is omitted.

Figure 6:
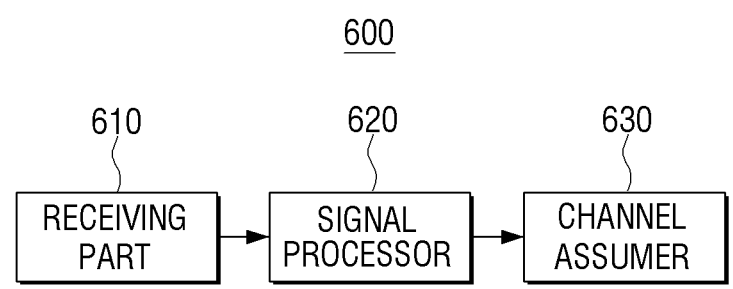
FIG. 6 is a block diagram illustrating a configuration of a receiver according to an exemplary embodiment.

Meanwhile, FIG. 6 is a block diagram illustrating a configuration of a receiving apparatus according to an exemplary embodiment.

According to FIG. 6, the receiver 600 may include a receiving part 610, signal processor 620, and channel assumer 630.

The receiver 600 may be one of a mobile terminal apparatus and a fixed terminal apparatus using an OFDM system of a DVB-T2 method.

The receiving part 610 may receive the OFDM symbol generated from the plurality of sub carriers that have been grouped into a plurality of groups and of which the phases and amplitudes have been changed by group, and grouping information.

Herein, each of the plurality of groups may include random numbers of sub carriers. It was already explained above that each of the plurality of groups may have a random number of sub carriers depending on circumstances, and thus more detailed explanation is omitted.

In addition, as illustrated in FIG. 5, the receiving part 610 may separately receive a sub carrier index 510.

Meanwhile, the signal processor 620 may convert the OFDM symbol into a plurality of sub carriers, and determine the number of sub carriers included in each of the plurality of groups based on the grouping information.

Herein, the grouping information may include information on the number of the sub carriers randomly grouped into each of the plurality of groups.

In addition, the grouping information may comprise a table showing the number of sub carriers included in each of the plurality of groups. Such a table showing the number of sub carriers is the sub carrier index 510 of FIG. 5.

In addition, in the case where the signal processor 620 received index 0 for the sub carrier group 1 based on the sub carrier index 510 of FIG. 4, that is the grouping information, the signal processor 620 may determine that the sub carrier group 1 comprises four (4) sub carriers.

Furthermore, in the case where the signal processor 620 received index 2 for the sub carrier group 2, the signal processor 620 may determine that the sub carrier group 2 comprises 16 sub carriers.

Meanwhile, the channel assumer 630 may perform a channel assumption based on the number of sub carriers determined.

If the number of sub carriers included in each group is known, the channel assumer 630 may acknowledge a section size of each group, and thus may determine a section for which a channel assumption is to be made.

Furthermore, in the case where a signal of one of the plurality of sub carriers belonging to one group weakens or is damaged, it is possible to assume a value using one of the remaining sub carriers belonging to that same group.

Therefore, the channel assumer 630 may perform a channel assumption based on the number of sub carriers included in each group based on the sub carrier index.

Meanwhile, a signal received in the receiver 600 may be depicted as in equations 3 below.

$$Y^{AVSG} = H_K \otimes X_K^{AVSG} + N$$

$$X_K^{AVSG} = W_K^{AVSG} \otimes X$$

$$W_K^{AVSG} = [A_C \cdot e^{-j\theta_0}, \ldots, A_K \cdot e^{-j\theta_K}] \qquad (2)$$

In the above equations 2, $Y^{AVSG}$ denotes the signal being received in the receiver 600. In addition, $H_K$ denotes the channel situation. Furthermore, $X_K^{AVSG}$ denotes a signal that has been converted in the time domain from a signal where a random phase ($\theta_0 - \theta_K$) and amplitude value ($A_0 - A_K$) in the frequency domain of the transmitting apparatus 100 has been applied, and N denotes the size of noise mixed during transmission.

Therefore, to the signal received in the receiver 600, a random phase and amplitude value are applied by the sub carrier grouping part 110 in the frequency domain, and a signal converted into the time domain by IFFT is output from the transmitter 100. This signal is multiplied by the value corresponding to the channel situation and then added to the noise.

That is, the random phase values applied to each of the sub carrier group are used for differentiating between the sub carriers, and do not affect the intensity of signals.

Figure 7:
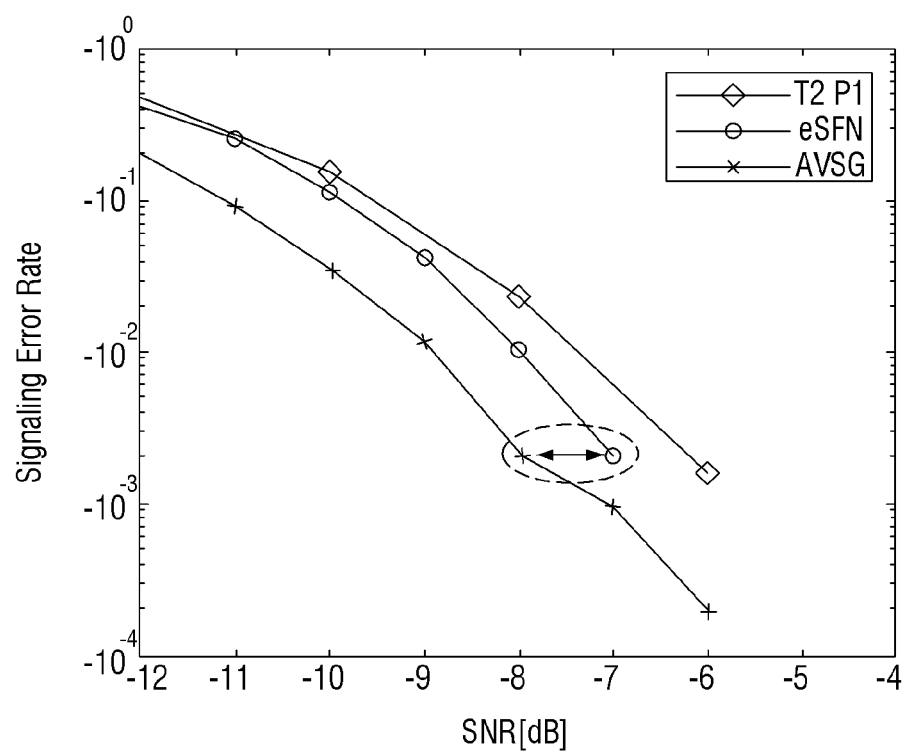
FIGS. 7 and 8 are views illustrating an effect of transmission performance according to grouping, phase, and amplitude change of sub carriers according to exemplary embodiments.
Figure 8:
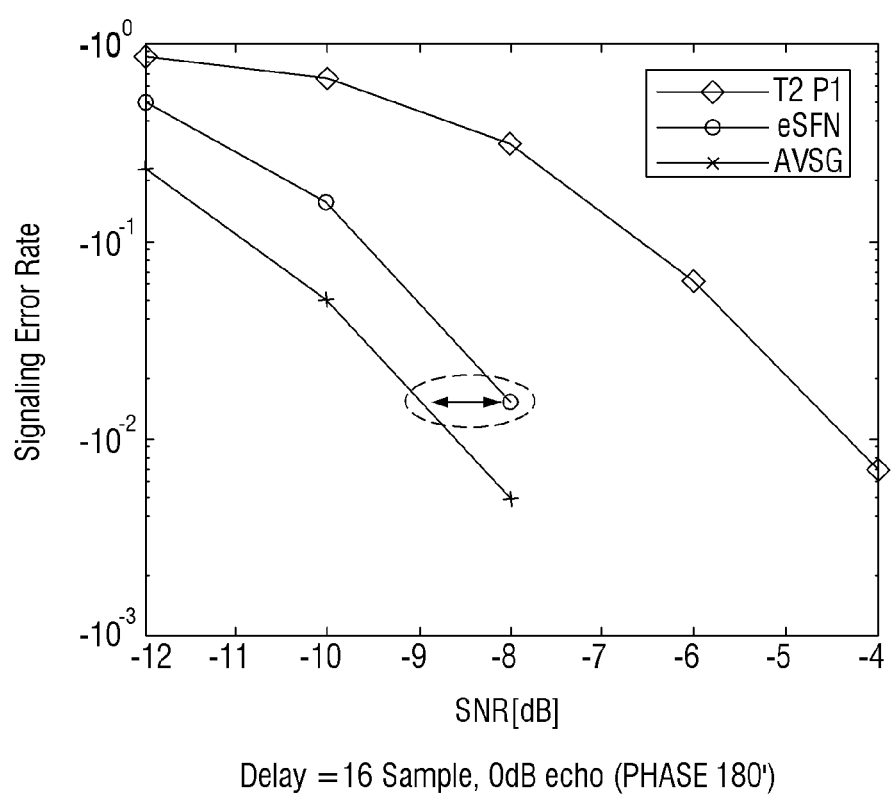

Meanwhile, FIGS. 7 and 8 are views illustrating the effects of transmission performance according to the grouping, phase and amplitude changes of the sub carriers, according to exemplary embodiments.

With reference to FIG. 7, T2 P1 denotes the channel assumption effect using a preamble, eSFN denotes the channel assumption effect using CCD, and AVSG denotes the effect of transmission performance using the grouping, phase and amplitude changes of the sub carriers according to the aforementioned embodiments.

Herein, when comparing the SNR which is the same signaling error rate of sSFN and AVSG, the SNR of sSFN is 10-7 whereas the SNR of AVSG is 10-8. That is, the SNR rate of AVSG is smaller than the SNR rate of eSFN, and thus the former has a much better transmission performance.

That is, in the case of using the CDD method, the sub carrier grouping part 110 of the transmitter 100 according to the aforementioned embodiments may perform grouping of the plurality of sub carriers into random numbers by group, and randomly change the phases of the plurality of sub carriers by group in order to overcome the deterioration of performance due to long echo.

In addition, in order to overcome the situation where a signal cannot be precisely restored when a Null occurs as in 0 db echo channel, the sub carrier grouping part reduces the performance deterioration caused by the 0 db echo by randomly changing the size of the plurality of sub carriers of which the phases have been changed by group.

Furthermore, the receiver 600 may receive the table of information of the plurality of sub carriers grouped in random numbers by group, that is information on the number of sub carriers randomly grouped into a plurality of groups, and may precisely perform a channel assumption based on the information on the number of sub carriers received.

FIG. 9 is a flowchart for explaining a method of controlling a transmitting apparatus. according to an exemplary embodiment.

According to the method illustrated in FIG. 9, it is possible to perform grouping of a plurality of sub carriers into a plurality of groups, and randomly change the phases and amplitudes of the plurality of sub carriers by group (S910).

Herein, the changing may involve performing grouping of the plurality of sub carriers in random numbers by group.

Furthermore, the changing may involve randomly changing the phases of the plurality of sub carriers by group in order to differentiate between the plurality of groups, and randomly changing the amplitudes of the plurality of sub carriers of which the phases have been changed by group.

Furthermore, it is possible to generate at least one OFDM symbol from the plurality of sub carriers of which the phases and amplitudes have been randomly changed by group, and transmit the generated OFDM symbol and grouping information (S920).

Herein, the grouping information may comprise information on the number of sub carriers that have been randomly grouped into each of the plurality of groups.

Furthermore, the grouping information may comprise a table showing the number of sub carriers included in each of the plurality of groups.

FIG. 10 is a flowchart for explaining a method of controlling a receiving apparatus, according to an exemplary embodiment.

According to the method illustrated in FIG. 10, it is possible to receive the OFDM symbol and grouping information generated from the plurality of sub carriers of which the phases and amplitudes have been randomly changed (S1010).

Herein, each of the plurality of groups may comprise a random number of sub carriers.

In addition, the grouping information may comprise a table showing the number of sub carriers included in each of the plurality of groups.

Furthermore, it is possible to convert the OFDM symbol into a plurality of sub carriers, and determine the number of sub carriers included in each of the plurality of groups based on the grouping information (S1020).

In addition, it is possible to perform a channel assumption based on the number of sub carriers determined (S1030).

Meanwhile, there may be provided a non-transitory computer readable medium for storing a program for consecutively performing a controlling method of the above embodiments.

For example, there may be provided a non-transitory computer readable medium storing a program for performing an operation of grouping a plurality of sub carriers into a plurality of groups and randomly changing phases and amplitudes of the plurality of sub carriers by group, and an operation of generating at least one OFDM symbol from the plurality of sub carriers of which the phases and amplitudes have been randomly changed.

Furthermore, there may be provided a non-transitory computer readable medium storing a program for performing an operation of receiving at least one OFDM symbol and grouping information generated from the plurality of sub carriers that have been grouped into a plurality of groups and of which the phases and amplitudes have been changed by group and converting the OFDM symbol into a plurality of sub carriers, and determining the number of sub carriers included in each of the plurality of groups based on the grouping information, and an operation of performing an channel assumption based on the number of sub carriers determined.

A non-transitory computer readable medium refers to a computer readable medium that is capable of storing data semi-permanently and not a medium storing data for a short period of time such as a register, cache, and memory etc. More specifically, the aforementioned various applications and programs may be stored in a non-transitory computer readable medium such as a compact disc (CD), digital versatile disc (DVD), hard disk, blue ray disk, universal serial bus (USB), memory card, read-only memory (ROM), etc.

Components, elements or units represented by a block as illustrated in FIGS. 1-3, 5 and 6 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like.

Furthermore, although a bus is not illustrated in the aforementioned block diagram where the transmitter and receiver are illustrated, communication between the configurative elements may be made through a bus. Furthermore, in each device, a processor such as a CPU and micro-processor that performs various operations may be further included.

Although a few exemplary embodiments of the inventive concept have been shown and described, it would be appreciated by those skilled in the art that changes may be made in these embodiments without departing from the principles and spirit of the inventive concept, the scope of which is defined in the claims and their equivalents.

What is claimed is:

1. A transmitter comprising:
at least one memory configured to store computer executable instructions; and
at least one processor configured to execute the computer executable instructions, the computer executable instructions controlling the at least one processor to perform:
a sub carrier grouping operation of grouping a plurality of sub carriers into a plurality of groups, and changing phases and/or amplitudes of the plurality of sub carriers by group so that the plurality of groups of sub carriers have different phases and/or amplitudes; and
a transmitting operation of generating at least one Orthogonal Frequency-Division Multiplexing (OFDM) symbol from the plurality of groups of sub carriers of which the phases and/or the amplitudes have been changed by group, and transmitting the OFDM symbol and information about the grouping,
wherein the grouping a plurality of sub carriers comprises grouping the plurality of sub carriers such that at least two groups of the plurality of groups of sub carriers have different numbers of sub carriers.

2. The transmitter according to claim 1, wherein the grouping information comprises information on a number of sub carriers grouped into each of the plurality of groups.

3. The transmitter according to claim 1, wherein the changing phases and/or amplitudes of the plurality of sub carriers comprises changing the phases of the plurality of the sub carriers in order to differentiate the plurality of groups and changing the amplitudes of the sub carriers of which the phases have been changed, by group.

4. The transmitter according to claim 1, wherein the grouping a plurality of sub carriers comprises grouping the plurality of sub carriers such that at least one of a number of sub carriers in each of the plurality of groups and a number of the plurality of groups is determined considering a channel condition of a receiver of the OFDM symbol.

5. The transmitter according to claim 1, wherein the grouping a plurality of sub carriers comprises grouping the plurality of sub carriers such that a number of sub carriers in a group of the plurality of groups for a mobile receiver of the OFDM symbol is greater than a number of sub carriers in a group of the plurality of groups for a fixed receiver of the OFDM symbol.

6. The transmitter according to claim 1, wherein the changing phases and/or amplitudes of the plurality of sub carriers by group comprises changing both phases and amplitudes of the plurality of sub carriers by group.

7. A receiver comprising:
   at least one memory comprising computer executable instructions; and
   at least one processor configured to execute the computer executable instructions, the computer executable instructions controlling the at least one processor to perform:
   a receiving operation of receiving at least one Orthogonal Frequency-Division Multiplexing (OFDM) symbol generated from a plurality of sub carriers which are grouped into a plurality of groups and of which phases and/or amplitudes have been changed by group so that the plurality of groups of sub carriers have different phases and/or amplitudes, and grouping information about the grouping;
   a signal processing operation of converting the OFDM symbol into the plurality of sub carriers, and determining a number of sub carriers included in each of the plurality of groups based on the grouping information; and
   a channel assuming operation of performing a channel assumption based on the number of the sub carriers included in each of the plurality of groups,
   wherein the grouping a plurality of sub carriers comprises grouping the plurality of sub carriers such that at least two groups of the plurality of groups of sub carriers have different numbers of sub carriers.

8. The receiver according to claim 7, wherein the grouping information comprises information on the number of the sub carriers included in each of the plurality of groups.

9. The receiver according to claim 7, wherein the plurality of sub carriers are grouped such that at least one of a number of sub carriers in each of the plurality of groups and a number of the plurality of groups is determined considering a channel condition of the receiver of the OFDM symbol.

10. The receiver according to claim 7, wherein the plurality of sub carriers are grouped such that a number of sub carriers in a group of the plurality of groups for a mobile receiver of the OFDM symbol is greater than a number of sub carriers in a group of the plurality of groups for a fixed receiver of the OFDM symbol.

11. A method of controlling a transmitter using at least one processor, the method comprising:
   grouping a plurality of sub carriers into a plurality of groups, and changing phases and/or amplitudes of the plurality of sub carriers by group;
   generating at least one Orthogonal Frequency-Division Multiplexing (OFDM) symbol, which is generated from the plurality of groups of sub carriers of which phases and amplitudes have been changed, per group, so that the plurality of groups of sub carriers have different phases and/or amplitudes; and
   transmitting the generated OFDM symbol and grouping information,
   wherein the grouping a plurality of sub carriers comprises grouping the plurality of sub carriers such that at least two groups of the plurality of groups of sub carriers have different numbers of sub carriers.

12. The method according to claim 11, wherein the grouping information comprises information on a number of sub carriers grouped into each of the plurality of groups.

13. The method according to claim 11, wherein the changing comprises changing the phases of the plurality of the sub carriers in order to differentiate the plurality of groups, and randomly changing the amplitudes of the sub carriers of which the phases have been changed, by group.

14. The method according to claim 11, wherein the changing phases and/or amplitudes of the plurality of sub carriers by group comprises changing both phases and amplitudes of the plurality of sub carriers by group.

15. A method of controlling a receiver using at least one processor, the method comprising:
   receiving at least one Orthogonal Frequency-Division Multiplexing (OFDM) symbol generated from a plurality of sub carriers which are grouped into a plurality of groups and of which phases and/or amplitudes have been changed by group so that the plurality of groups of sub carriers have different phases and/or amplitudes, and grouping information about the grouping;
   converting the OFDM symbol into the plurality of sub carriers, and determining a number of sub carriers included in each of the plurality of groups based on the grouping information; and
   performing a channel assumption based on the number of the sub carriers included in each of the plurality of groups,
   wherein the grouping a plurality of sub carriers comprises grouping the plurality of sub carriers such that at least two groups of the plurality of groups of sub carriers have different numbers of sub carriers.

16. The method according to claim 15, wherein the grouping information comprises information on the number of the sub carriers included in each of the plurality of groups.

17. The method according to claim 15, wherein the plurality of sub carriers are grouped such that at least one of a number of sub carriers in each of the plurality of groups and a number of the plurality of groups is determined considering a channel condition of the receiver of the OFDM symbol.

18. The receiver according to claim 15, wherein the plurality of sub carriers are grouped such that a number of sub carriers in a group of the plurality of groups for a mobile receiver of the OFDM symbol is greater than a number of sub carriers in a group of the plurality of groups for a fixed receiver of the OFDM symbol.

* * * * *